United States Patent [19]
Koelewyn

[11] Patent Number: 5,988,547
[45] Date of Patent: Nov. 23, 1999

[54] ADJUSTABLE DRAG SYSTEM FOR FISHING SPOOL WITH CLUTCH MEMBERS BETWEEN SPOOL-SUPPORTING BEARINGS

[76] Inventor: Robert W. Koelewyn, 110 Birchwood Rd., Fairfield, Conn. 06430

[21] Appl. No.: 08/979,087

[22] Filed: Nov. 26, 1997

[51] Int. Cl.[6] .................................................. A01K 89/02
[52] U.S. Cl. ........................... 242/246; 242/291; 242/303
[58] Field of Search .................................... 242/246, 291, 242/302, 303, 319

[56] References Cited

U.S. PATENT DOCUMENTS

| | | | |
|---|---|---|---|
| 1,907,759 | 3/1933 | Takeuchi et al. | 242/246 |
| 3,385,457 | 5/1968 | Kiest | 242/303 |
| 4,951,897 | 8/1990 | Takeuchi | 242/246 |
| 5,100,079 | 3/1992 | Toda | 242/246 X |
| 5,149,008 | 9/1992 | Oi | 242/246 |
| 5,259,565 | 11/1993 | Hitomi | 242/246 X |
| 5,328,127 | 7/1994 | Yoshikawa | 242/319 X |
| 5,564,640 | 10/1996 | Egasaki et al. | 242/319 X |
| 5,603,465 | 2/1997 | Henriksson | 242/246 |

*Primary Examiner*—Katherine A. Matecki
*Assistant Examiner*—Emmanuel M. Marcelo
*Attorney, Agent, or Firm*—Ware, Fressola, Van der Sluys & Adolphson LLP

[57] ABSTRACT

A fishing reel has a spool for fishing line rotatably mounted about a shaft operable by a crank. A drag assembly mounts the spool to the shaft with two ball bearing assemblies and a clutch pack of washers consisting of drag washers keyed to the spool, drag washers keyed to the shaft and friction washers between the spool-keyed and shaft-keyed washers. An adjustment mechanism compresses the clutch pack of washers through the inner races of the bearing assemblies.

23 Claims, 2 Drawing Sheets

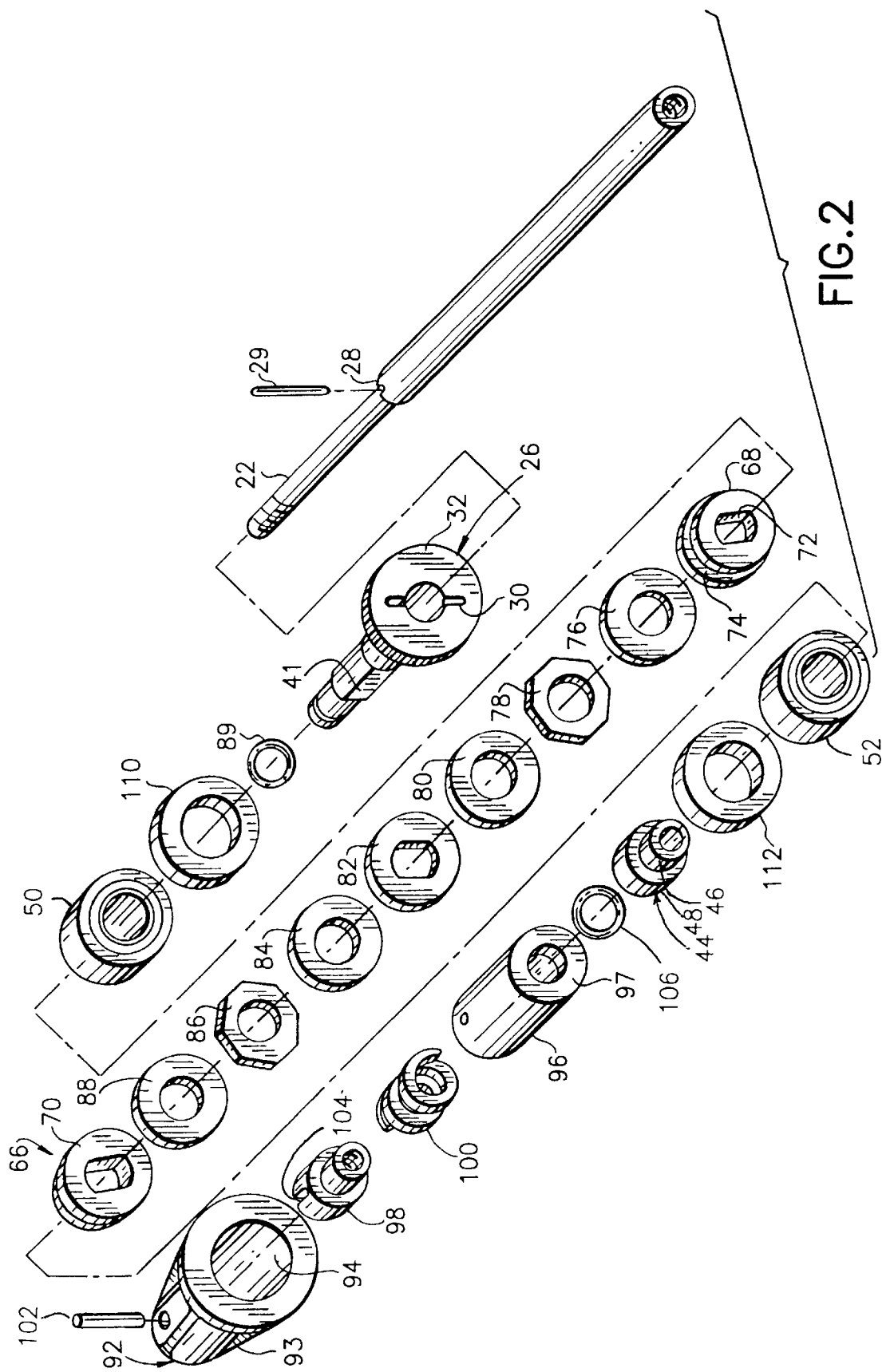

ADJUSTABLE DRAG SYSTEM FOR FISHING SPOOL WITH CLUTCH MEMBERS BETWEEN SPOOL-SUPPORTING BEARINGS

FIELD OF THE INVENTION

This invention relates to fishing reels and more particularly to an adjustable drag assembly incorporated in a fishing reel.

BACKGROUND OF THE INVENTION

In sport fishing, one of the challenges is to land a fish using a line of relatively light weight with respect to the weight of the fish. The term "weight" of the line is a term specifying its strength, usually expressed as "n" pounds test line, where "n" is the number of pounds of tensile strength of the line. Typically, fishing line can have a tensile strength in the range of approximately 2–50 pounds.

One way to protect the line against breakage is to utilize a fishing reel incorporating a drag assembly. In such reels, the drag assembly provides an interface between a spool carrying the fishing line and a hand-operated shaft and crank for turning the spool. The object is to adjust the drag so that the spool will slip relative to the shaft and crank and thereby protect the line from breaking by releasing the line from the spool.

It will further be appreciated that the drag system provides for the unwinding and release of line without having to rotate the shaft and crank assembly. If a large fish, full of fight, is hooked, the fish may dive or run and thereby unwind line rapidly from the spool. Typically, such unwinding is too rapid for the fisherman to keep up through operation of the crank. Releasing the crank in such a situation is a poor option, as the reel then provides no resistance to unwinding, when such resistance is necessary for fighting and tiring the fish. Also, if the crank were released to permit the line to unwind, it would be difficult to regain control of the crank until such time as the fish slowed or stopped.

It will also be appreciated that the drag assembly limits the force that can be applied to the fish through the line as the fisherman reels in the fish or flexes the fishing rod. The drag assembly provides for slippage of the spool relative to the shaft and crank if the fisherman attempts to apply force in excess of the strength of the line or if the fish should suddenly apply such force to the line.

For best fishing results, the fisherman may want to set the drag to utilize the maximum strength of the fishing line without breaking the line. This requires that the drag assembly operate accurately and smoothly. In particular, it is important that the drag assembly operate to provide resistance to unwinding line from the spool, but be unaffected by other aspects of the operation of the reel, such as whether the line is being released from one of the sides or the center of the spool, and, of course, the operation of the drag assembly itself. Most importantly, the drag assembly should be adjustable to cooperate with the strength of the line, but must not inadvertently break the line and lose a large fish.

SUMMARY OF THE INVENTION

It is a principal object of the invention herein to provide a drag assembly for fishing reels.

It is an additional object of the invention herein to provide a drag assembly for fishing reels which exhibits accurate, consistent and smooth operation.

It is a further object of the invention herein to provide a drag assembly for fishing reels which operates independently of other aspects of the fishing reel.

It is another object of the invention herein to provide a drag assembly for a fishing reel which is rugged and reliable.

In carrying out this invention and in one illustrative embodiment thereof, there is provided a fishing reel including a body adapted to be received by a rod, with the body mounting a shaft and crank for rotating the shaft. The shaft extends to a threaded distal end. A spool for windably releasing and retrieving fishing line is rotatably mounted surrounding the shaft by a drag assembly.

The drag assembly includes a first bearing assembly supporting a first side of the spool and a second bearing assembly having an inner ring slideably received with respect to the shaft and an outer ring supporting a second side of the spool adjacent the threaded distal end of the shaft. A clutch is received between the inner race of the second bearing and a clutch stop fixed with respect to the shaft. An adjustment mechanism is secured to the threaded distal end of the shaft for adjustably compressing the clutch between the inner race of the second bearing and the clutch stop, the clutch thereby providing an adjustable frictional engagement between the spool and the shaft.

According to aspects of the invention, the bearing assembly and its inner and outer rings are a ball bearing having an inner race and an outer race. The clutch is a clutch pack of washers including drag washers keyed to the shaft alternating with drag washers key to the spool. According to a more particular aspect, friction washers are provided between the shaft-keyed drag washers and the spool-keyed drag washers.

Also, according to aspects of the invention, the inner race of the first bearing is interposed between the clutch pack of washers and the clutch stop, and according to a particular aspect, the inner races of both bearings are used to compress the clutch pack. The clutch pack includes end drag washers positioned adjacent to the first and second bearing assemblies, the end drag washers being configured to provide clearance with respect to the outer race of the adjacent bearing.

According to additional aspects of the invention, the adjustment mechanism is threaded to the distal end of the shaft. A compression nut is provided for compressing a clutch spring providing compressive force on the clutch pack of washers. According to a particular structure, the clutch spring is restrained within a keeper.

According to further aspects of the invention, a hub is provided surrounding the shaft, and the hub defines the clutch stop, a bearing seat adjacent the clutch stop and a clutch washer shank for receiving the shaft-keyed washers. A thrust collar is also provided between the adjustment mechanism and the clutch pack of disks, and defines a seat for the second bearing assembly.

According to other aspects of the invention, seals are provided between the shaft and the spool for maintaining the clutch pack free of water or dirt to assure its smooth operation and long life.

The spool and drag assembly is advantageously utilized in a spinning reel, but may also be incorporated in fly casting reels, bait casting reels, and trolling reels.

The invention together with further objects, aspects, features and advantages will be more clearly understood from the following description of the preferred embodiment taken in connection with the accompanying drawings.

BRIEF DESCRIPTION OF THE DRAWINGS

FIG. 2 is an exploded perspective view of parts of the drag assembly of the fishing reel of FIG. 1.

The same reference numerals refer to the same elements throughout the various figures.

DESCRIPTION OF THE PREFERRED EMBODIMENT

Figure 1:
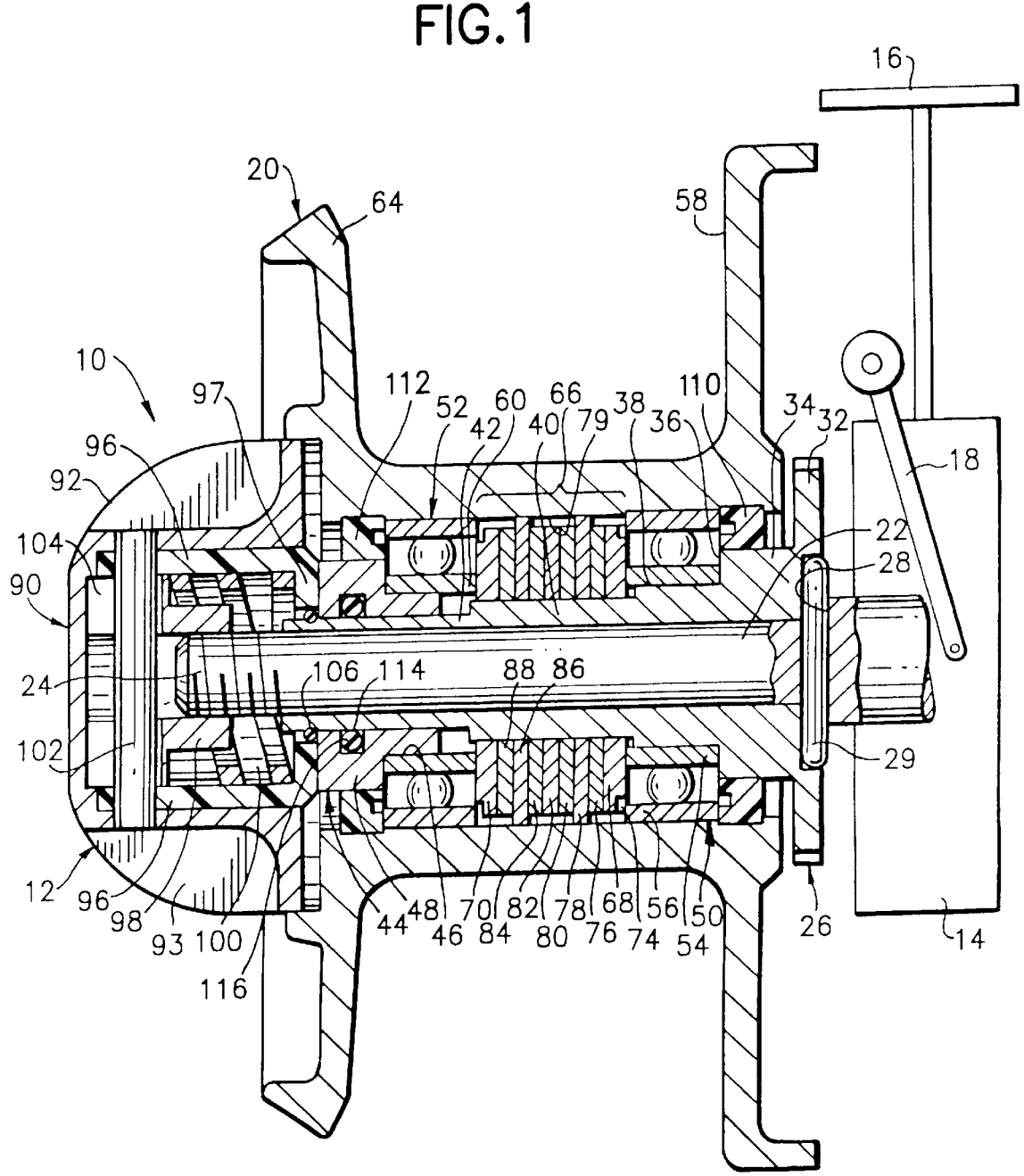
FIG. 1 is a sectional view of the spool and drag assembly of a fishing reel according to the invention herewith, the remainder of the fishing reel shown schematically.

A fishing reel 10 incorporating a drag assembly generally indicated at 12 is illustrated in FIG. 1, and parts of the drag assembly 12 are illustrated in FIG. 2. The fishing reel 10 includes a body 14, shown schematically, which includes a foot 16 adapted to mount the fishing reel 10 on a rod. The fishing reel 10, although shown schematically, is intended as a spinning reel, and has a crank 18 rotatably mounted with respect to the body for retrieving fishing line.

The fishing reel 10 further includes a spool 20 for windably releasing and retrieving fishing line, and the spool 20 is rotatably mounted surrounding a shaft 22 extending from the body 14 to a threaded distal end 24. The drag assembly 12 is generally interposed between the shaft 22 and the spool 20, and frictionally couples the spool 20 with the shaft 22. The drag assembly 12 is adjustable so that the spool 20 will rotate with respect to the shaft 22 if the force on line wound on the spool exceeds the coupling forces of the drag assembly.

The drag assembly 12 first comprises a center hub 26, which fits over the shaft 22 adjacent a step 28 therein, and is keyed to rotate with the shaft 22 by a pin 29 received in slot 30 of the inner end flange 32 of the center hub. The center hub 26 next comprises a shoulder 34 transitioning at clutch stop 36 to a bearing seat 38. Extending from the bearing seat 38 is a clutch washer shank 40, and an end tube 42. The clutch washer shank 40 is provided with opposed flat surfaces 41, best seen in FIG. 2.

A thrust collar 44 is slideably received on the end tube 42, and includes a bearing seat 46 and a head flange 48.

The spool 20 is mounted surrounding the shaft 22 on a first, inner bearing assembly 50 and a second, outer bearing assembly 52. The first bearing assembly 50 has an inner ring 54 received on the bearing seat 38 of the center hub 26, and an outer ring 56 supporting the inner end of the spool 20 adjacent its inner side wall 58. An inner ring 60 of the second, outer bearing assembly 52 is received on the bearing seat 46 of the thrust collar 44, and an outer ring 62 supports the outer portion of spool 20, adjacent its outer side wall 64. In the preferred embodiment shown, the bearing assemblies 50, 52 are ball bearings having inner and outer races as their inner and outer rings.

The drag assembly 12 includes a clutch 66 including clutch members in the form of a clutch pack of washers, which are best seen individually in the exploded perspective view of FIG. 2. The clutch pack includes two shaft-keyed end drag washers 68 and 70, positioned respectively adjacent the first bearing assembly 50 and the second bearing assembly 52. By "shaft-keyed", it is meant that the center openings of the washers have two opposed flat edges which fit onto the flats 41 on the clutch washer shank 40 of the center hub 26, so that the washers do not turn relative to the center hub and the shaft 22 to which the center hub is pinned. For example, the center opening 72 of washer 68 is keyed in this manner. The shaft-keyed end drag washer 68 is also peripherally notched at 74 and, with reference to FIG. 1, this configuration permits the end drag washer 68 to bear against the inner race 54 of the first bearing assembly 50, but to avoid contact with the outer bearing race 56. The shaft-keyed end drag washer 70 is similarly peripherally notched to provide contact with the inner race 60 of bearing assembly 52 and avoid contact with the outer race 62 thereof.

Moving from left to right in FIGS. 1 and 2, the clutch pack of washers 66 also includes a friction washer 76 keyed to neither the shank 40 nor the spool 20, and an octagonal spool-keyed drag washer 78 which is keyed to the inside opening of the spool 20. By "spool-keyed", it is meant that the octagonal outside edge of washer 78 mates with a octagonally shaped portion 79 of the inside of spool 20, so that the washer 78 turns with spool 20 but is free to rotate with respect to the center hub 26 and the shaft 22. On the other hand, the shaft-keyed drag washers keyed to the shank 40 turn freely with respect to the spool 20 inside the portion 79.

Adjacent to octagonal spool-keyed drag washer 78 is another unkeyed friction washer 80, a shaft-keyed drag washer 82, another unkeyed friction washer 84, another octagonal spool-keyed drag washer 86, and another unkeyed friction washer 88 adjacent the shaft-keyed end drag washer 70. Accordingly, the clutch pack 66 is comprised of drag washers keyed to the shank and shaft 20 alternating with drag washers keyed to the spool, with friction washers between the center shaft-keyed drag washers and the octagonal spool-keyed drag washers. The keyed drag washers are made of stainless steel. The unkeyed friction washers 76, 80, 84 and 88 are made of Rulon, a synthetic polymer which provides suitable friction and good wear characteristics.

The thrust collar 44, bearing assembly 52, clutch pack 66 and bearing assembly 50 are maintained on the center hub 26 by a clip 106. This prevents inadvertent disassembly of these elements of the clutch pack.

The drag assembly 12 further comprises an adjustment mechanism 90 which operates to compress the clutch pack 66 and thereby adjust the frictional connection with the spool 20 and the shaft 22. The adjustment mechanism 90 includes a knob 92 having vanes 93 on its exterior surface for ease of rotation. The interior of the knob is formed as a cylindrical cavity 94 which receives a spring keeper cup 96 having annular end wall 97, a compression nut 98, and a clutch spring 100. The spring keeper cup 96 is pinned to the knob 92 by means of pin 102. The compression nut 98 is threaded to the threaded distal end 24 of the shaft 22, and is rotated by the pin 92, which extends through a slot 104 formed in the end of the compression nut. The slot is sufficiently long that the compression nut may move in and out on the shaft 22, depending upon its threaded adjustment thereon, without interference between the pin and the shaft. Such rotation of the compression nut 98 adjusts the pressure of the clutch spring 100, which is applied to the annular cup end 97 of the spring keeper cup 96.

The cup end 97 bears against the head flange 48 of thrust collar 44, and the thrust collar thereby transmits the force of the clutch spring 100 through the inner race 60 of bearing assembly 52 to the outer shaft-keyed end washer 70. This acts to compress the clutch pack 66 between the bearing race 60 of bearing assembly 52 and the inner bearing race 54 of bearing assembly 50, which is grounded against the clutch pack stop 36. The thrust collar 44 and bearing assembly 52 are incrementally slideable to transmit the force freely.

Therefore, the spool 20 may rotate with respect to the shaft 22 whenever the rotational force on the spool 20 exceeds the static frictional force within the clutch pack, and the clutch pack applies frictional force or drag between the shaft and spool. When the spool 20 does so rotate, it rotates on the bearing assemblies 50 and 52, which are of very low friction such that the adjustable frictional force of the clutch pack provides virtually all of the drag. But most importantly, the drag does not change because of the supporting structure for the spool or factors other than the clutch pack.

The clutch pack is sealed against moisture and dirt by two annular seals 110 and 112, respectively located just below the outer wall 58 and inner wall 64 of the reel. These seals are preferably fabricated of Nitril® composition and contribute a very small amount of predictable friction to the drag forces. An O-ring 114 carried by thrust collar 44 prevents moisture and dirt from entering the clutch pack along the center hub.

It will be appreciated that the consistency of the friction adjustment of the clutch pack is achieved by transmitting the force of compression independently of the rotation of the spool. In the fishing reel 10 described above, this is achieved by transmitting the compression force through the inner bearing races to the clutch pack washers. Additionally, if desired, the clutch pack could directly engage a structural clutch stop on the center hub, rather than engaging the inner bearing race 54 of the first bearing assembly 50. The bearing race 54 is conveniently available to bear against the clutch stop, but is merely an extension of the clutch stop.

It will also be appreciated that the drag assembly is useful in other types of reels than the spinning reel schematically shown. It can be adapted to fly casting reels, bait casting reels and trolling reels.

Accordingly, a fishing reel incorporating a drag assembly has been provided which is capable of sensitive adjustment as well as accurate and smooth operation. The drag assembly provides for sealing, so that it is unaffected by moisture and dirt, and will therefore give a long period of satisfactory service.

It will be appreciated that changes and modifications varied to fit particular operating requirements and environments will be apparent to those skilled in the art and that the invention is not considered limited to the examples chosen for purposes of illustration, and includes all changes and modifications do not constitute a departure from the true spirit and scope of this invention as claimed in the following claims and equivalents thereof.

I claim:

1. A fishing reel comprising:
  A) a shaft extending to a distal end from a body adapted for mounting the fishing reel to a rod, the shaft connected to a crank for rotation thereof;
  B) a spool for windably releasing and retrieving fishing line;
  C) a drag assembly rotatably mounting the spool surrounding the shaft, the drag assembly having:
    (1) a first bearing assembly mounted between the shaft and the spool supporting a first inner side of the spool more closely adjacent the crank,
    (2) a second bearing assembly mounted between the shaft and the spool and having an inner ring and an outer ring, the second bearing assembly supporting a second outer side of the spool more closely adjacent the distal end of the shaft,
    (3) a clutch received between the inner ring of the second bearing assembly and a clutch stop fixed with respect to the shaft, the clutch including at least one member secured to the shaft and at least one member secured to the spool, and
    (4) an adjustment mechanism secured to the distal end of the shaft for adjustably compressing the clutch members between the inner ring of the second bearing assembly and the clutch stop fixed with respect to the shaft, the clutch thereby providing an adjustable frictional drag engagement between the spool and the shaft, with the spool rotatable on the first and second bearings subject to the frictional drag engagement but isolated from the compression of the clutch members.

2. A fishing reel as defined in claim 1, wherein the clutch members are a clutch pack of washers having drag washers keyed to the shaft alternating with drag washers keyed to the spool.

3. A fishing reel as defined in claim 2, wherein the bearing assembly having an inner ring and an outer ring is a ball bearing assembly having an inner race and an outer race.

4. A fishing reel as defined in claim 1, wherein the bearing assembly having an inner ring and an outer ring is a ball bearing having an inner race and an outer race.

5. A fishing reel comprising:
  A) a shaft extending to a distal end from a body adapted for mounting the fishing reel to a rod, the shaft connected to a crank for rotation thereof;
  B) a spool for windably releasing and retrieving fishing line;
  C) a drag assembly rotatably mounting the spool surrounding the shaft, the drag assembly having:
    (1) a first bearing assembly mounted between the shaft and the spool supporting a first inner side of the spool more closely adjacent the crank,
    (2) a second bearing assembly mounted between the shaft and the spool and having an inner ring and an outer ring, the second bearing assembly supporting a second outer side of the spool more closely adjacent the distal end of the shaft,
    (3) a clutch received between the inner ring of the second bearing assembly and a clutch stop fixed with respect to the shaft, the clutch including at least one member secured to the shaft and at least one member secured to the spool, the clutch members including a clutch pack of washers having drag washers keyed to the shaft alternating with drag washers keyed to the spool with the end drag washer of the clutch pack adjacent the second bearing assembly keyed to the shaft and engaged by the inner ring, and the shaft-keyed end drag washer configured for clearance from the outer ring of the bearing assembly, and
    (4) an adjustment mechanism secured to the distal end of the shaft for adjustably compressing the clutch members between the inner ring of the second bearing assembly and the clutch stop, the clutch thereby providing an adjustable frictional drag engagement between the spool and the shaft.

6. A fishing reel as defined in claim 5, wherein the clutch pack of drag washers includes a friction washer between each drag washer keyed to the shaft and the adjacent drag washer keyed to the spool.

7. A fishing reel as defined in claim 6, wherein the clutch pack of disks includes three drag washers keyed to the shaft, two drag washers keyed to the spool, and four friction washers, each friction washer interposed between a drag washer keyed to the shaft and a drag washer keyed to the spool.

8. A fishing reel as defined in claim 5, wherein the spool-keyed drag washers are keyed to the spool by a polygonal outer edge received by the spool.

9. A fishing reel as defined in claim 8, wherein the drag washers keyed to the spool having an octagonal outer edge.

10. A fishing reel comprising:
  A) a shaft extending to a distal end from a body adapted for mounting the fishing reel to a rod, the shaft connected to a crank for rotation thereof;
  B) a spool for windably releasing and retrieving fishing line;
  C) a drag assembly rotatable mounting the spool surrounding the shaft, the drag assembly having:
    (1) a first bearing assembly mounted between the shaft and the spool supporting a first inner side of the spool more closely adjacent the crank, the first bearing assembly being a ball bearing having an inner race and an outer race, (2) a second bearing assembly mounted between the shaft and the spool and having an inner ring and an outer ring, the second bearing assembly supporting a second outer side of the spool more closely adjacent the distal end of the shaft, (3) a clutch received between the inner ring of the second bearing assembly and the inner race of the first ball bearing assembly, the inner race of the first ball bearing assembly positioned between the clutch and a clutch stop fixed with respect to the shaft, the clutch including at least one member secured to the shaft and at least one member secured to the spool, and (4) an adjustment mechanism secured to the distal end of the shaft for adjustably compressing the clutch members between the inner ring of the second bearing assembly and the clutch stop, the clutch thereby providing an adjustable frictional drag engagement between the spool and the shaft.

11. A fishing reel as defined in claim 10, wherein the clutch members are a clutch pack of washers having drag washers keyed to the shaft alternating with drag washers keyed to the spool.

12. A fishing reel as defined in claim 11, wherein the end drag washer of the clutch pack adjacent the second bearing is keyed to the shaft and engaged by the inner bearing race, and the shaft-keyed end drag washer is configured for clearance from the outer race of the second bearing.

13. A fishing reel as defined in claim 12, wherein the clutch pack of drag washers includes a friction washer between each drag washer keyed to the shaft and the adjacent drag washer keyed to the spool.

14. A fishing reel as defined in claim 13, wherein the spool-keyed drag washers are keyed to the spool by a polygonal outer edge received by the spool.

15. A fishing reel as defined in claim 14, wherein the clutch pack of disks includes three drag washers keyed to the shaft, two drag washers keyed to the spool, and four friction drag washers, each friction washer interposed between a drag washer keyed to the shaft and a drag washer keyed to the spool.

16. A fishing reel as defined in claim 10, and further comprising a hub surrounding and secured to rotate with the shaft, the hub configured to define the clutch stop, a bearing seat for the first bearing assembly and to receive and engage the shaft-keyed drag washers.

17. A fishing reel as defined in claim 16, and further comprising a thrust collar slidingly received on the hub, the thrust collar defining a bearing seat receiving and positioning the inner race of the second bearing against the clutch pack, the thrust collar butting against the adjustment mechanism for transmitting the force thereof to the clutch pack of disks.

18. A fishing reel as defined in claim 17, and further comprising two low friction seals respectively positioned between the inner side of the spool and the hub, and the outer side of the spool and the thrust collar to protect the bearings and clutch pack from ingress of water and debris.

19. A fishing reel comprising:

A) a body adapted for mounting the fishing reel to a rod, and further mounting a shaft and crank for rotating the shaft with the shaft extending from the body to a threaded distal end;

B) a center hub mounted to and surrounding the shaft with the threaded distal end of the shaft protruding therefrom, the center hub secured to turn with the shaft and the center hub defining a clutch pack stop, a bearing seat adjacent the clutch pack stop, a keyed shank, and an end tube;

C) a spool for windably releasing and retrieving fishing line, the spool positioned surrounding the shaft and center hub;

D) a first ball bearing including an inner race received on the bearing seat of the center hub and an outer race supporting an inner side of the spool adjacent the reel body;

E) a clutch pack of washers received between the center hub and the spool and including drag washers keyed to the shank of the center hub alternating with drag washers keyed to the spool, an end drag washer of the clutch pack being keyed to the center hub and bearing against the inner race of the inner bearing;

F) a thrust collar received on the end tube of the center hub and defining a bearing seat adjacent a head flange thereof;

G) a second ball bearing having an inner race received on the bearing seat of the thrust collar between the head flange and a second end base disk of the clutch pack, and an outer race supporting an outer side of the spool; and H) an adjustment knob threaded onto the distal end of the shaft and enclosing a clutch spring bearing on the head flange of the thrust collar for adjustably compressing the clutch pack of washers, thereby providing an adjustable drag of the fishing reel.

20. A fishing reel as defined in claim 19 and further comprising a friction washer positioned between each of the adjacent hub-keyed and spool-keyed drag washers, the friction washers being unkeyed.

21. A) a shaft extending to a distal end from a body adapted for mounting the fishing reel to a rod, the shaft connected to a crank for rotation thereof;

B) a spool for windably releasing and retrieving fishing line;

C) a drag assembly rotatably mounting the spool surrounding the shaft, the drag assembly having:

(1) a first bearing assembly mounted between the shaft and the spool and having an inner ring and an outer ring, the first bearing assembly supporting a first inner side of the spool more closely adjacent the crank, (2) a second bearing assembly mounted between the shaft and the spool and having an inner ring and an outer ring, the second bearing assembly supporting a second outer side of the spool more closely adjacent the distal end of the shaft, (3) a clutch received between the first and second bearing assemblies, the clutch including at least one member secured to the shaft and at least one member secured to the spool, and (4) an adjustment mechanism secured to the distal end of the shaft for adjustably and engagingly compressing the clutch members between one of the inner, or outer ring of the first bearing assembly and one of the inner or outer ring of the second bearing assembly, the clutch thereby providing an adjustable frictional drag engagement between the spool and the shaft, with the compression of the clutch members isolated between the first and second bearing assemblies.

22. The fishing reel of claim 21, wherein the first and second bearing assemblies are ball bearing assemblies each having an inner race and an outer race.

23. A fishing reel as defined in claim 22, wherein the clutch members are a clutch pack of washers having drag washers keyed to the shaft alternating with drag washers keyed to the spool.

* * * * *